(12) United States Patent
Kern et al.

(10) Patent No.: US 8,923,356 B1
(45) Date of Patent: Dec. 30, 2014

(54) GAS LASER PRE-IONIZATION OPTICAL MONITORING AND COMPENSATION

(71) Applicant: Kern Industries LLC, Wadena, MN (US)

(72) Inventors: Gerald L. Kern, Wadena, MN (US); William Allan Arden, Brainerd, MN (US)

(73) Assignee: Kern Technologies, LLC., Wadena, MN (US)

( * ) Notice: Subject to any disclaimer, the term of this patent is extended or adjusted under 35 U.S.C. 154(b) by 0 days.

(21) Appl. No.: 13/624,683

(22) Filed: Sep. 21, 2012

Related U.S. Application Data

(60) Provisional application No. 61/543,165, filed on Oct. 4, 2011.

(51) Int. Cl.
*H01S 3/097* (2006.01)

(52) U.S. Cl.
USPC .................................. 372/86; 372/61; 372/85

(58) Field of Classification Search
USPC ........................................................... 372/86
See application file for complete search history.

(56) References Cited

U.S. PATENT DOCUMENTS

| | | | |
|---|---|---|---|
| 3,357,690 A | 12/1967 | Firestone | |
| 3,970,497 A | 7/1976 | Glover et al. | |
| 4,177,404 A | 12/1979 | Eguchi | |
| 4,218,628 A * | 8/1980 | Harris | 359/327 |
| 4,260,958 A * | 4/1981 | Wayne et al. | 372/87 |
| 4,469,931 A | 9/1984 | Macken | |
| 4,533,814 A | 8/1985 | Ward | |
| 4,550,273 A | 10/1985 | Boettcher et al. | |
| 4,851,683 A * | 7/1989 | Yang et al. | 250/339.03 |
| 4,977,805 A | 12/1990 | Corley, III | |
| 5,161,697 A | 11/1992 | Quick | |
| 5,216,689 A * | 6/1993 | Gardner et al. | 372/87 |
| 5,241,419 A * | 8/1993 | Pratt et al. | 359/634 |
| 5,290,383 A * | 3/1994 | Koshimizu | 156/345.25 |
| 5,320,704 A * | 6/1994 | Horioka et al. | 156/345.25 |
| 5,335,242 A * | 8/1994 | Hobart et al. | 372/95 |
| 5,373,528 A * | 12/1994 | Kuzumoto et al. | 372/87 |
| 5,426,661 A * | 6/1995 | Cohn et al. | 372/86 |
| 5,444,188 A | 8/1995 | Iwayama et al. | |
| 5,521,352 A | 5/1996 | Lawson | |

(Continued)

FOREIGN PATENT DOCUMENTS

| | | |
|---|---|---|
| JP | 55067181 | 5/1980 |
| JP | 59148376 | 8/1984 |

OTHER PUBLICATIONS

Avidtek, "What's with the Purple?", 2006, http://info.avidtek.com/whypurple.html, AvidTek, Inc.*

(Continued)

*Primary Examiner* — Colleen A Matthews
*Assistant Examiner* — Vu A Vu
(74) *Attorney, Agent, or Firm* — Merchant & Gould PC

(57) ABSTRACT

A slab laser includes first and second slabs defining an ionizing chamber intermediate the first slab and the second slab. A Radio Frequency Power Amplifier (RFPA) generates pulses to the ionizing chamber. The laser has a viewing window with access to the ionizing chamber and an optical sensor mounted to access the ionizing chamber through the viewing window. A controller is in communication with the optical sensor, and varies RFPA pulse power in response to the detection of glowing plasma by the optical sensor.

7 Claims, 3 Drawing Sheets

(56) References Cited

U.S. PATENT DOCUMENTS

| | | | |
|---|---|---|---|
| 5,578,229 A | 11/1996 | Barnekov et al. | |
| 5,748,663 A * | 5/1998 | Chenausky | 372/64 |
| 5,772,817 A | 6/1998 | Yen et al. | |
| 5,798,927 A | 8/1998 | Cutler et al. | |
| 5,807,761 A * | 9/1998 | Coronel et al. | 438/14 |
| 5,904,867 A | 5/1999 | Herke | |
| 5,909,277 A * | 6/1999 | Woskov et al. | 356/316 |
| 5,910,894 A | 6/1999 | Pryor | |
| 6,104,487 A * | 8/2000 | Buck et al. | 356/316 |
| 6,294,124 B1 | 9/2001 | Bauer et al. | |
| 6,677,828 B1 | 1/2004 | Harnett et al. | |
| 7,582,182 B2 * | 9/2009 | Matsumoto et al. | 156/345.24 |
| 7,583,717 B2 * | 9/2009 | Monty et al. | 372/55 |
| 7,729,503 B2 | 6/2010 | Young | |
| 7,885,308 B2 * | 2/2011 | Robotham et al. | 372/55 |
| 7,988,816 B2 * | 8/2011 | Koshiishi et al. | 156/345.47 |
| 8,265,116 B2 | 9/2012 | Newman et al. | |
| 8,369,373 B2 | 2/2013 | Allie et al. | |
| 8,391,329 B2 | 3/2013 | Fontanella | |
| 2003/0038112 A1 * | 2/2003 | Liu et al. | 216/60 |
| 2007/0195839 A1 * | 8/2007 | Monty et al. | 372/38.05 |
| 2009/0251700 A1 * | 10/2009 | Venugopal et al. | 356/437 |
| 2009/0326528 A1 * | 12/2009 | Karni et al. | 606/33 |
| 2011/0085580 A1 | 4/2011 | Allie et al. | |

OTHER PUBLICATIONS

"$CO_2$ Laser in Operation!", http://physics.mercer.edu/petepag/laserco2-1.html.*

Brounley, Richard W., "Mismatched Load Characterization for High-Power RF Amplifiers," (2004), *High Frequency Electronics*, pp. 30-38.

* cited by examiner

GAS LASER PRE-IONIZATION OPTICAL MONITORING AND COMPENSATION

BACKGROUND OF THE INVENTION

1. Field of the Invention

The present invention is directed to a system and method for monitoring pre-ionization in a gas laser prior to firing the laser.

2. Prior Art

Slab type gas lasers, such as carbon dioxide ($CO_2$) lasers, are widely used for industrial purposes and have developed into lightweight and economical devices for performing various industrial cutting, engraving and similar operations. Metal plates or slabs are utilized as electrodes having a large contact area and forming a chamber between the plates. Typically, cooling is provided within the slabs, such as a water cooling system, to prevent overheating of the laser.

In order to maintain conditions in which gas lasers are ready to fire a laser beam, the plasma in the firing chamber is pre-ionized, also known as "tickling" the laser. In order to ready the plasma to maintain the laser in a condition in which it is ready to fire quickly, short radio frequency pulses are sent to the laser tube. In this condition, the laser tube is ionized, but not ionized to such an extent that the laser actually emits a laser beam. Pre-ionizing the laser tube also creates a better Radio Frequency (RF) load matching between a Radio Frequency Power Amplifier (RFPA) and the laser allowing for improved rise time and fall time of the emitted laser beam.

It has been found that maintaining the proper pre-ionized state presents several challenges. If the pulses are not sufficiently wide, there will be delay in reaching an ionized state for firing the laser. Moreover, if there is a load mismatch between the laser tube and the RFPA, damage can be done to the RFPA from excess voltage feedback. Furthermore, if the pulses are too long, the laser may fire prematurely. Therefore, maintaining the proper pulsing prevents load mismatching and inaccurate laser firing.

In order to overcome these problems related to maintaining a pre-ionized state ready for firing of the laser, systems have been developed in an attempt to monitor the condition of the laser tube. In one system, the reflected RFPA power is monitored to determine if the laser is sufficiently pre-ionized. Although such a system may prevent some of the problems related to damage and inaccurate firing, the system has several drawbacks. The reflected RF power is an indirect measurement and also may not be sufficiently accurate to maintain the proper pre-ionized condition. Moreover, such a system is expensive and complicated and adds unwanted cost to the laser.

It can be seen that a new and improved system for maintaining the plasma in a laser at a pre-ionized condition is required. Such a system should be accurate and provide for maintaining a proper state of readiness to fire the laser tube. Moreover, such a system should provide for accurate, inexpensive and direct measurement of the conditions of the laser tube and controls to maintain the proper RFPA power and pulse width directed at the laser chamber. The present invention addresses these as well as other problems related to maintaining and monitoring pre-ionized conditions for gas slab lasers.

SUMMARY OF THE INVENTION

The present invention is directed to a gas slab laser utilizing a pre-ionizing control system and a method monitoring and maintaining pre-ionized conditions. The Radio Frequency Power Amplifier (RFPA) may direct Radio Frequency (RF) pulses to the plasma chamber to maintain the plasma in a pre-ionized state wherein the plasma needs just an additional small increase in pulse width to generate a laser beam. Controlling the RFPA can make sure that the proper pulse width control is maintained so that problems due to RFPA feedback or from the laser misfiring too soon or the laser not firing when desired are avoided.

When the gas in the chamber is ionized, it emits a visible light (glow) that can be detected. According to the present invention, an optical sensor is placed so that the glow of the ionized plasma can be detected through a viewing window. When the optical sensor detects a glow from the gas ionizing, it sends a signal to a controller. The controller then adjusts the RF pulsing from the Radio Frequency Power Amplifier (RFPA) so that the pre-ionized condition is maintained. The controller may be set so that more or less RF power is supplied to the laser to maintain the properly pre-ionized state. The system utilizes direct monitoring of the laser ionization rather than an indirect measurement of other parameters.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

DETAILED DESCRIPTION OF THE PREFERRED EMBODIMENT

Figure 1:
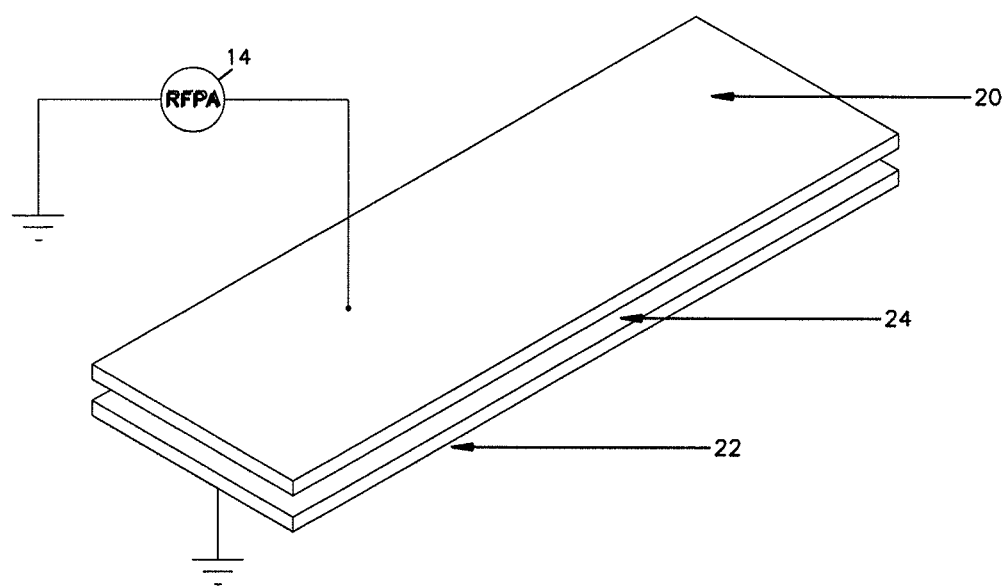
FIG. 1 is a perspective view of a carbon dioxide slab laser with a Radio Frequency Power Amplifier (RFPA)
Figure 2:
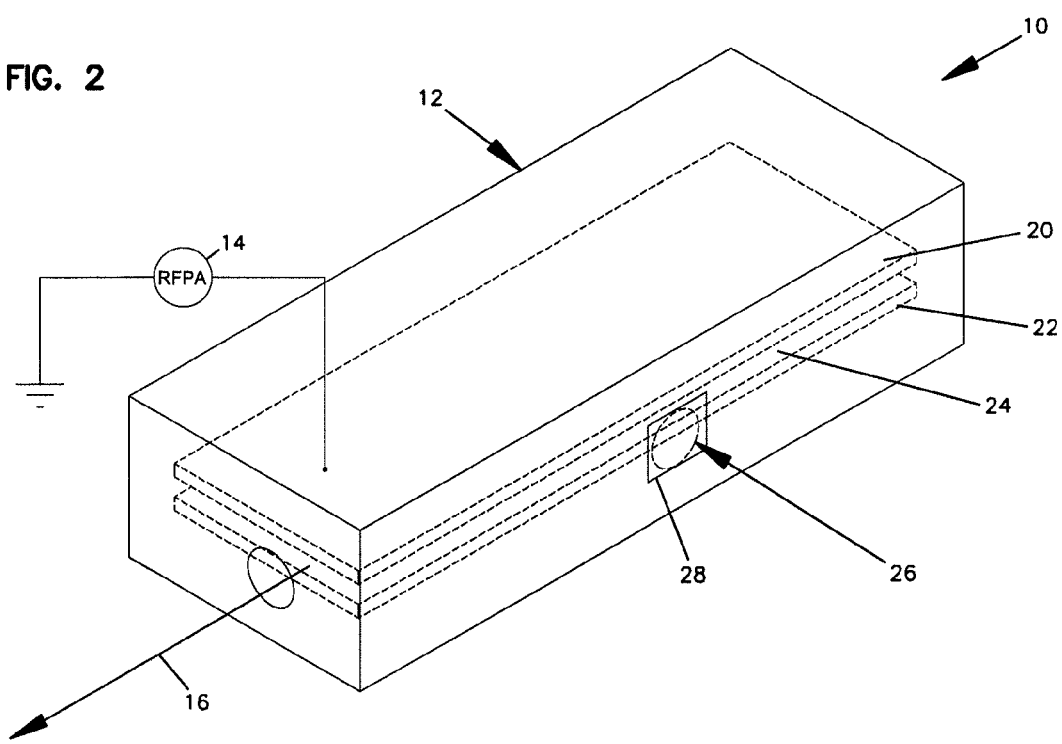
FIG. 2 is a perspective view of a slab laser having an optical sensor according to the principles of the present invention.

Referring now to the drawings, in particular to FIGS. 1 and 2, there is shown a gas slab laser, generally designated (10) including a laser case (12). The laser (10) also includes a series of mirrors and other optical elements (not shown) that are well known in the art and may take on several conventional configurations. A Radio Frequency Power Amplifier (RFPA) (14) shown in FIG. 1 provides Radio Frequency (RF) power pulses to the laser chamber (24), also known as a laser tube, containing carbon dioxide plasma. The chamber (24) is formed between a top plate (20) and a bottom plate (22). The plates or slabs (20, 22) act as electrodes for ionizing the laser gases and also may incorporate cooling elements or include an associated cooling system, such as a water cooling system.

Prior to firing the laser (10), the RFPA (14) may direct short RF pulses to "tickle" the laser by energizing the plasma to a pre-ionized state in the chamber (24). In a pre-ionized state, the laser beam (16) can be quickly fired when the RFPA's RF pulse width is increased.

Figure 3:
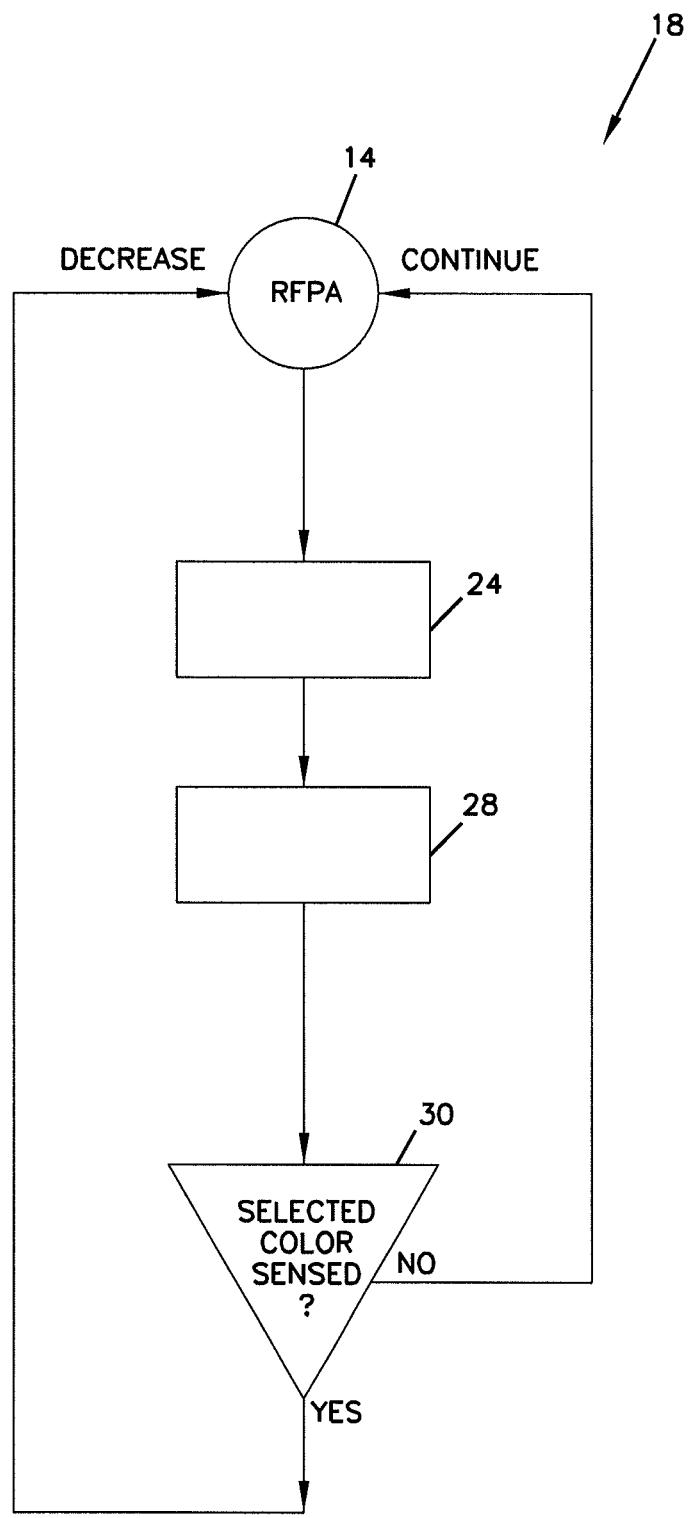
FIG. 3 is a diagrammatic view of the pre-ionizing control system for the laser shown in FIG. 2.

As shown in FIGS. 2 and 3, a pre-ionizing control system (18) includes a controller (30) in communication with an optical sensor (28). The laser (10) includes a viewing window (26) providing direct access to the chamber (24) for the optical sensor (28). With such an arrangement, the presence of a plasma glow may be directly sensed by the optical sensor (28). It can be appreciated by those skilled in the art that pre-ionized plasma emits a glow, for example a dim purple color glow with a $CO_2$ laser. By monitoring the presence of glowing plasma with the sensor (28), the controller (30) can determine whether the plasma is properly pre-ionized and therefore whether the laser (10) is ready to fire. The controller (30) may then make adjustments. It has been found that the power necessary to initially obtain a plasma glow in a pre-ionized state (to "light" the gas) is greater than the power needed to maintain the pre-ionized state. Therefore, once a glow has been detected, the RF power from the RFPA may be decreased. In addition, if no glow is detected, the controller may increase the RF power/pulse width from the RFPA until a glow is detected by the optical sensor (28).

As shown in FIG. 3, in operation, the RFPA (14) directs RF pulses to the plasma chamber (24). The presence of glowing plasma in chamber (24) is monitored by the optical sensor (28). The reading from the optical sensor (28) is communicated to the controller (30). The controller (30) analyzes the intensity and/or color of the glow to make adjustments to the signals sent to the RFPA (14). If no glow from the chamber (24) between the slabs (20, 22) is sensed, the controller (30) will direct the RFPA (14) to send RF pulses having an increased pulse width to the chamber (24). When a glow is detected by the optical sensor (28), the controller (30) will direct the RFPA (14) to decrease power and the pulse width directed to the chamber (24), but will continue to "tickle" by maintaining a series a lower power pulses directed to the chamber (24). Such a tickle pulse might be in the range of about 3-4 microseconds for a typical $CO_2$ industrial laser. By maintaining the plasma in a pre-ionized state, there is no delay due to energizing the gases in the chamber when the laser (10) is fired. The monitoring and controls work in the background so the laser (10) is always ready to be fired.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A carbon dioxide slab laser comprising:
   a first slab;
   a second slab;
   a laser ionizing chamber intermediate the first slab and the second slab containing carbon dioxide gas;
   a radio frequency power amplifier (RFPA) source providing pulses to the laser ionizing chamber to excite the carbon dioxide gas;
   a viewing window with access to the laser ionizing chamber, the viewing window located at a side of the first slab and the second slab with the access being intermediate the first slab and the second slab;
   an optical sensor mounted remote from the ionizing chamber to access the laser ionizing chamber through the viewing window;
   a controller in communication with the optical sensor, the controller configured to vary pre-ionizing RFPA power in response to detection by the optical sensor of presence of a plasma glow in the laser ionizing chamber to maintain the slab laser plasma in an energized pre-ionized state below a laser firing threshold.

2. The slab laser according to claim 1, wherein the glow is purple.

3. The slab laser according to claim 1, wherein the controller is configured to vary pulse width to maintain the slab laser in an energized pre-ionized state.

4. The slab laser according to claim 1, wherein the laser ionizing chamber comprises a laser tube.

5. A method of pre-ionizing laser plasma in a laser tube of a carbon dioxide gas laser with a radio frequency power amplifier (RFPA), the method comprising:
   directing radio frequency (RF) pulses from the RFPA to the laser tube to energize carbon dioxide laser gases and attain pre-ionized glowing plasma;
   providing an optical sensor outside the laser tube and sensing presence of the pre-ionized energized glowing plasma in the laser tube;
   controlling power to the laser tube by varying the duration of RF pulses directed to the laser tube based on detecting the presence of pre-ionized glowing plasma so that the pulses have power insufficient to fire the laser and to maintain the plasma in the laser tube of the slab laser in an energized pre-ionized state below a laser firing threshold.

6. The method for pre-ionizing laser plasma according to claim 5, wherein the glowing plasma is purple.

7. The method for pre-ionizing laser plasma according to claim 5, wherein the laser comprises a carbon dioxide slab laser.

* * * * *